(12) United States Patent
Segawa

(10) Patent No.: US 6,671,317 B1
(45) Date of Patent: Dec. 30, 2003

(54) INFORMATION PROCESSING UNIT, INFORMATION PROCESSING METHOD, AND RECORDING MEDIUM THEREWITH

(75) Inventor: Hiroyuki Segawa, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/447,156

(22) Filed: Nov. 23, 1999

(30) Foreign Application Priority Data

Nov. 30, 1998 (JP) .......................................... 10-339277

(51) Int. Cl.[7] ................................ H04B 1/66; B25J 9/16
(52) U.S. Cl. ................................................. 375/240.01
(58) Field of Search ........................... 375/240, 240.16, 375/240.24, 240.25; 318/568.1, 568.11, 568.16, 568.22, 568.24, 568.2; 901/28, 46, 48, 2, 15, 9, 23; 395/94; 601/33; B25J 9/16; H04B 1/66

(56) References Cited

U.S. PATENT DOCUMENTS 5,086,401 A * 2/1992 Glassman et al. ............ 395/94
5,466,213 A * 11/1995 Hogan et al. ................. 601/33
5,493,192 A * 2/1996 Nihei et al. ............... 318/568.2
5,767,648 A * 6/1998 Morel et al. .............. 318/568.1

FOREIGN PATENT DOCUMENTS

| JP | 406198585 A | * | 7/1994 | ............ B25J/13/00 |
| JP | 406339885 A | * | 12/1994 | ............ B25J/13/00 |

* cited by examiner

*Primary Examiner*—Chris Kelley
*Assistant Examiner*—Tung Vo
(74) *Attorney, Agent, or Firm*—Bell, Boyd & Lloyd, LLC

(57) ABSTRACT

An articulated motion estimating unit stores in advance angle information, angular velocity information, and torque information for each joint of an articulated object. Assuming that torque changes are constant, the articulated motion estimating unit predicts motion by repetition of an updating process and a prediction process. In the prediction process, the present cycle angular acceleration is computed based on stored information using a dynamics equation. Then, the next cycle angle and angular acceleration are computed based on an ordinary differential equation. Finally, the next cycle estimated error covariance is computed, and the next cycle motion is thereby predicted.

6 Claims, 15 Drawing Sheets p1 p2-a p2-b p2-c p2-d

INFORMATION PROCESSING UNIT, INFORMATION PROCESSING METHOD, AND RECORDING MEDIUM THEREWITH

BACKGROUND OF THE INVENTION

1. Field of the Invention

The present invention relates to information processing units, information processing methods, and recording media therewith. More particularly, the present invention relates to an information processing unit, an information processing method, and a recording medium therewith, for accurately predicting subsequent motion by storing motion information and torque information in advance and predicting the subsequent motion based on the stored motion information and torque information.

2. Description of the Related Art

Hitherto, conventional systems for measuring or estimating motion parameters of an object based on an input of an image or a sensor output fail to accurately estimate these parameters due to noise included in the input data and the inadequacy of data relative to the parameters to be estimated.

To this end, Kalman filters described in "A New Approach to Linear Filtering and Prediction Problems" by R. E. Kalman, Trans. ASME-J. Basic Eng., pp. 35–45 March 1960, or recursive estimation filters derived from the Kalman filters have been used.

In linear systems, Kalman filters are often used as the recursive estimation filters. In nonlinear systems, extended Kalman filters (hereinafter referred to as "EKF") are the most popular. The EKF is described in "Applied Optimal Estimation" by A. Gelb, The Analytic Science Corp., 1974. Other applications of Kalman filters include unscented filters described in "A New Extension of the Kalman Filter to Nonlinear Systems" by S. J. Julier, Proc. of AeroSense: The 11th International Symposium on Aerospace/Defense Sensing, Simulation and Control, and pseudo-Kalman filters described in "Using Pseudo Kalman Filters in the Presence of Constraints, Application to Sensing Behaviours" by T. Vileville and P. Sander, Technical Report 1669, INRIA-Sophia, Valbonne, France, 1992.

FIG. 11 is a block diagram of a Kalman filter 120. The Kalman filter 120 employs an efficient least-square method. The Kalman filter 120 estimates states in the past, present, and future. The Kalman filter 120 is capable of estimating state variables based on incomplete information. In addition to the state variables to be estimated, the Kalman filter 120 updates simultaneously error covariance indicating estimation accuracy. Use of the Kalman filter 120 is known as a robust estimation method.

The Kalman filter 120 is one of the recursive estimation filters. The Kalman filter 120 always exclusively uses the most recent data from observed values input in series. The Kalman filter 120 includes a predicting unit 131 for predicting motion and an updating unit 132 for updating the predicted data. Estimation is carried out by alternatively repeating prediction and updating of the data by, respectively, the predicting unit 131 and the updating unit 132.

Referring to FIG. 12, operation of the Kalman filter 120 is described. A set of state variables to be estimated is defined as a state vector x. When the number of the state variables is n, the state vector x is n-dimensional. A k-th cycle (one cycle corresponds to one observation cycle) state vector x is expressed by a state vector $X_k$. A prediction process for predicting a subsequent state is expressed by an expression (1). In expressions illustrated hereinafter, a vector is expressed with an arrow at the top thereof; a first order time differential of a vector is indicated by a dot () at the top thereof; and a second order time differential is indicated by two dots at the top () thereof:

$$\vec{x}_{k+301} = A_k \vec{x}_k + \vec{w}_k \quad (1)$$

In the above expression, a matrix $A_k$ is the k-th cycle state transition matrix with n rows and n columns. $w_k$ represents prediction process noise generated in the prediction process. It is assumed that $w_k$ is normally distributed Gaussian noise.

An observation process is expressed by an expression (2):

$$\vec{y}_k = H_k \vec{x}_k + \vec{v}_k \quad (2)$$

The covariance matrix of the process noise generated in the process shown by the expression (1) is expressed by $Q_k$.

In the expression (2), $y_k$ indicates an observation vector representing a set of the k-th cycle observed values, and $H_k$ represents the k-th cycle observation matrix. The observation vector $y_k$ does not necessary have the same number of dimensions as the state vector. If the observation vector $y_k$ is assumed to be m-dimensional, the observation matrix $H_k$ has m rows and n columns. $v_k$ represents a vector of observation noise generated in the observation process, which is assumed to be Gaussian noise. The covariance matrix of the observation noise is expressed by $R_k$.

The Kalman filter 120 performs estimation through repetitions of predicting and updating. The estimated state vector before the updating is expressed by an expression (3), and the estimated state vector after the updating is expressed by an expression (4):

$$X_k^- \quad (3)$$

$$X_k^\sim \quad (4)$$

Let $P_k$ represent the estimated error covariance after the updating. The estimated error covariance before the updating is expressed by an expression (5):

$$P_k^- \quad (5)$$

Assuming the above, processing of the predicting unit 131 is described. As shown in FIG. 12, the predicting unit 131 performs process e1 to predict the next state based on an expression (6):

$$X_{+e,ovsk}+1+ee = A_k X_k^\sim \quad (6)$$

The predicting unit 131 performs process e2 to predict the next estimated error covariance $P^-_{k+1}$ based on an expression (7):

$$P^-_{k+1} = A_k P_k A_k^T + Q_k \quad (7)$$

In the above expression, $A_k^T$ represents a transposed matrix of the state transition matrix $A_k$.

Next, processing of the updating unit 132 is described. The updating unit 132 performs process c1 to compute a Kalman gain $K_k$ based on an expression (8):

$$K_k = P^-_k H_k^T (H_k P^-_k H_k^T + R_k)^{-1} \quad (8)$$

In the above expression, $H_k^T$ represents a transposed matrix of the observation matrix $H_k$, and $(\ )^{-1}$ represents an inverse matrix of the matrix within the parentheses ( ).

The updating unit 132 performs process c2 to update the estimated value of the state variable based on the input observed value using an expression (9):

$$\vec{X}_k = \vec{X}_{+e,ovsk} + ee + K_k(\vec{y}_k - H_k \vec{X}_{+e,ovsk} + ee) \quad (9)$$

The updating unit 132 performs process c3 to update the estimated error covariance $P_k$ based on an expression (10):

$$P_k = (I - K_k H_k) P^-_k \quad (10)$$

In the above expression, I represents a unit matrix that has n×n dimensions.

The above-described Kalman filter 120 assumes that both the prediction process and the observation process are linear. In practice, however, the prediction process and the observation process are often nonlinear. To accommodate such nonlinear processes, various types of derived filters including the EKF have been proposed. The EKF, which is most commonly used, is described below.

The EKF expresses a prediction process as an expression (11) (corresponding to the expression (1) of the Kalman filter 120), and an observation process as an expression (12) (corresponding to the expression (2) of the Kalman filter 120):

$$\vec{x}_{k+301} = f(\vec{x}_k) + \vec{w}_k \quad (11)$$

$$\vec{y}_k = h(\vec{x}_k) + \vec{v}_k \quad (12)$$

In the expression (11), f represents a nonlinear state transition matrix. In the expression (12), h represents a nonlinear observation matrix.

In the EKF, the actual estimation framework is expressed by an expression (13) which corresponds to process e1 of the Kalman filter 120 (FIG. 12):

$$\vec{X}_{+e,ovsk} + 1 + ee = f(\vec{X}_k) \quad (13)$$

In the EKF, processing corresponding to process c2 of the Kalman filter 120 (FIG. 12) is expressed by an expression (14):

$$\vec{X}_k = \vec{X}_{+e,ovsk} + ee + K_k(\vec{y}_k - h(\vec{X}_{+e,ovsk} + ee)) \quad (14)$$

In the EKF, a state transition matrix $A_k$ is expressed by an expression (15), and an observation matrix $H_k$ is expressed by an expression (16):

$$A_{k(i,j)} = \frac{\partial f_{(i)}(\vec{X}_k)}{\partial x_{k(j)}} \quad (15)$$

$$H_{k(i,j)} = \frac{\partial h_{(i)}(\vec{X}_k)}{\partial \vec{x}_{k(j)}} \quad (16)$$

In the expression (15), $A_{k(i,j)}$ represents a matrix element in the i-th row, j-th column, of the state transition matrix $A_k$, which is computed by partially differentiating the i-component of a function f by the j-component of the state vector $x_k$. In the expression (16), $H_{k(i,j)}$ represents a matrix element in the i-th row, j-th column, of the observation matrix $H_k$, which is computed by partially differentiating the i-component of a function h by the j-component of the state vector $x_k$.

Except the points described above, the EKF operates in the same manner as the Kalman filter 120.

In the above-described conventional recursive filters, the prediction process (represented by the expression (1) or the expression (2)) employed for prediction assumes constant angular velocity, constant angular acceleration, constant moving velocity, or constant moving angular acceleration.

For example, the angular acceleration is assumed to be constant in publications such as "Measurement of Angular Velocity and Angular Acceleration in Sports Using Extended Kalman Filters" by K. Ohta and K. Kobayashi, Collected Papers of the Society of Instrument and Control Engineers, vol. 31, no. 9. By way of another example, the moving acceleration is assumed to be constant in publications such as "Tracking Hand Dynamics in Unconstrained Environments" by Y. Azoz, IEEE Automatic Face and Gesture Recognition, pp. 274–279, April 1998. These assumptions do not sufficiently model the physical properties of an object. Therefore, the following problems may arise:

1. When inputting an image, ambiguous information on the depth direction may not be recovered.
2. Estimation errors may occur due to inadequacy of information for predicting the motion of a fast-moving object between two successive images or between successively sampled sensor information.

These problems are described below by way of examples. Referring to FIG. 13, it is assumed that an arm 142 of an object (a person) 141 is observed from the p-direction (direction from the right side of the object 141) and from the i-direction perpendicular to the p-direction. Joints include a wrist joint 142-1, an elbow joint 142-2, and a shoulder joint 142-3. Referring to FIGS. 14A and 14B and FIGS. 15A to 15E, examples of the first problem described above are illustrated. FIGS. 14A and 14B are illustrations of the arm 142 of the object 141 observed from the i-direction. Continuous movement of the arm 142 is illustrated by FIGS. 14A and 14B, moving from image i1 shown in FIG. 14A to image i2 shown in FIG. 14B. Image p1 in FIG. 15A and image p2-a in FIG. 15B illustrate images of the arm 142 of the object 141 captured from the p-direction, when images i1 and i2 in FIGS. 14A and 14B are observed. Even if the data of image p1 in FIG. 15A is accurately estimated for image i1 in FIG. 14A, when the prediction process is inappropriate, the actual position indicated by the data of image i2 in FIG. 14B will not be estimated correctly for image p2-a in FIG. 15B. Instead, the actual position may be erroneously estimated as image p2-b in FIG. 15C, image p2-c in FIG. 15D, or image p2-d in FIG. 15E.

Referring now to FIGS. 16A and 16B, an example of the second problem described above is illustrated. When an image moves from the state shown in FIG. 16A to the state shown in FIG. 16B, the magnitude of movement is great. The conventional method fails to accurately predict the second state (FIG. 16B) based on the first state (FIG. 16A) due to inadequacy of information.

SUMMARY OF THE INVENTION

Accordingly, it is an object of the present invention to provide an information processing unit, an information processing method, and a recording medium therewith, to accurately predict motion of an object.

In accordance with a first aspect of the present invention, there is provided an information processing unit including an information storage unit for storing motion information and torque information of an object and a motion estimating unit for estimating motion based on the information stored by the information storage unit.

In accordance with another aspect of the present invention, there is provided an information processing method including an information storing step for storing motion information and torque information of an object and a motion estimating step for estimating motion based on the information stored in the information storage step.

In accordance with another aspect of the present invention, there is provided a recording medium for recording a computer readable program. The program includes an information obtaining step for obtaining motion information and torque information of an object and a motion estimating step for estimating motion based on the information obtained in the information obtaining step.

Preferably, in the information processing unit and the information processing method, the motion information and the torque information of the object are stored, and the motion is estimated based on the stored information.

Preferably, in the program recorded on the recording medium, the motion information and the torque information of the object are obtained, and the motion is estimated based on the obtained information.

DESCRIPTION OF THE PREFERRED EMBODIMENTS

Figure 1:
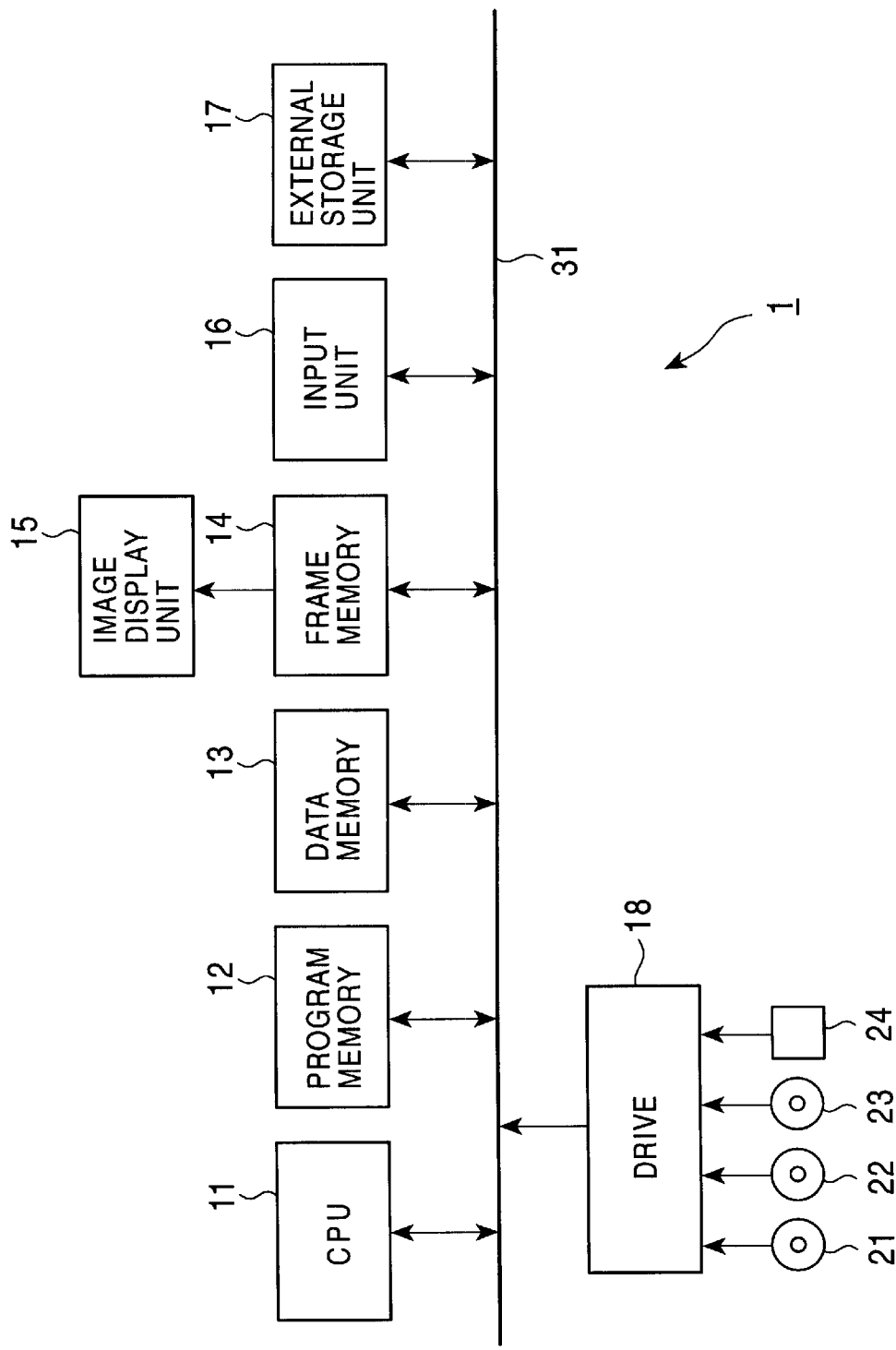
FIG. 1 is a block diagram of an articulated motion estimating unit 1 according to an embodiment of the present invention.

FIG. 1 is a block diagram of an articulated motion estimating unit 1 according to an embodiment of the present invention. A CPU 11 performs various processes in accordance with a program stored in a program memory 12.

A data memory 13 stores not only angle information, angular velocity information, and torque information for estimating motion, but also observation information, such as a signal from a sensor or information from an image sequence, which is necessary to update estimated values. A frame memory 14 stores the image sequence when directly accessing the image sequence as the observation information, or image information generated to visualize estimated three-dimensional parameters.

An image display unit 15 displays the image information stored in the frame memory 14. An input unit 16 inputs an image and a sensor signal using a mouse and a keyboard.

An external storage unit 17 stores observed values or estimated information. Preferably, a random access recording medium, such as a hard disk drive (HDD) or an optical disk, is used as the external storage unit 17. However, a recording medium which is not particularly suited for random access, such as a tape streamer, may also be employed as the external storage unit 17. An external storage unit of another system connected to a network may be used as the external storage unit 17. Alternatively, a combination of the above-described various recording media and the external storage unit 17 may used as the external storage unit 17. Such media may be used for storing the observed values from the image or the sensor when the articulated motion estimating unit 1 performs batch processing.

Figure 2:
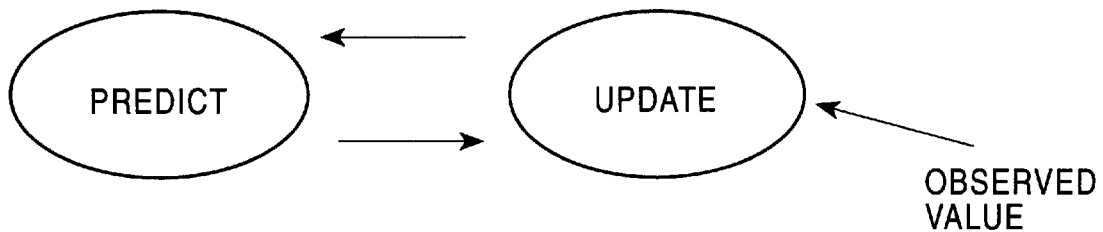
FIG. 2 is an illustration of a processing concept of the articulated motion estimating unit shown in FIG. 1.

Referring now to FIG. 2, a processing concept of the articulated motion estimating unit 1 is illustrated. The articulated motion estimating unit 1 pre-stores angle information, angular velocity information, and torque information for each joint of an articulated object. Assuming that torque changes are constant, the articulated motion estimating unit 1 estimates motion by repetitively updating and predicting the input observation data based on the stored angle information, angular velocity information, and torque information.

A k-th cycle state vector $x_k$ for each joint of the object to be estimated, which is used in the articulated motion estimating unit 1, is expressed by an expression (17):

$$\vec{x_k} = \begin{bmatrix} \vec{q_k} \\ \dot{\vec{q_k}} \\ \vec{\tau_k} \end{bmatrix} \quad (17)$$

In the above expression, $q_k$ represents the k-th cycle angle for each joint, $q_k$ with a dot (˙) represents the k-th cycle angular velocity for each joint, and $\tau_k$ represents the k-th cycle torque for each joint. When the degree of freedom of articulation is n-degree, the state vector $x_k$ is three-n dimensional.

Referring to FIGS. 3 to 6, operation of the articulated motion estimating unit 1 is described. In step S1 in FIG. 3, a user inputs an initial estimated value $X_0$ of the state vector $x_k$ shown in the expression (17) and an initial estimated error covariance $P_0$ of estimated error covariance $P_k$ using the input unit 16. These values may be input directly by the user, or alternatively, may be supplied from other sensor information. When inputting other image data, the user may perform input by performing interactive three-dimensional fitting using the keyboard and the mouse of the input unit 16 while looking at the first frame of the image. The initial values may be output from another motion parameter estimating unit.

Figure 3:
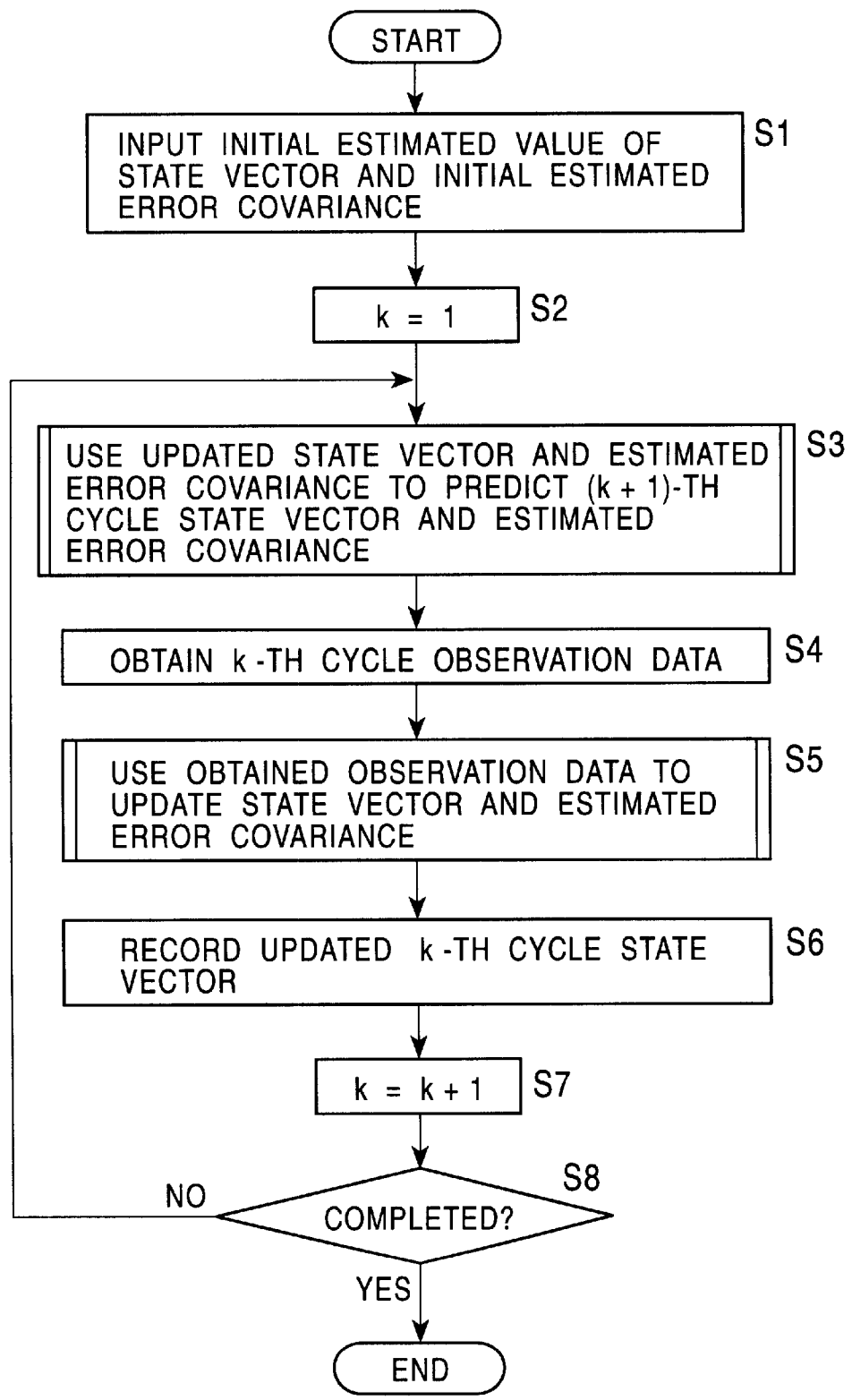
FIG. 3 is a flowchart showing operation of the articulated motion estimating unit 1 shown in FIG. 1.
Figure 6:
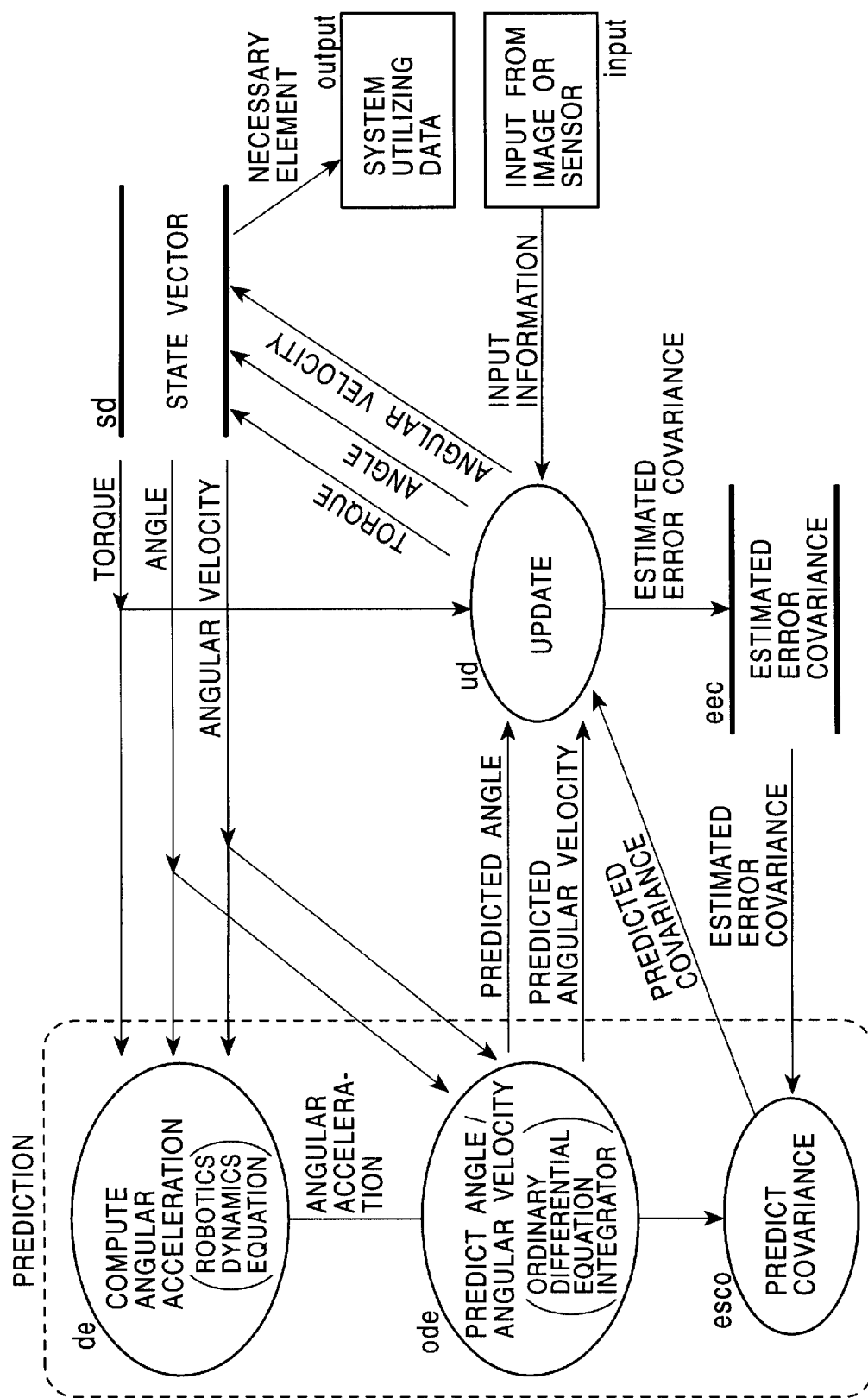
FIG. 6 is a data flowchart showing the operation of the articulated motion estimating unit 1 shown in FIG. 1.

Step S1 in FIG. 3 corresponds to input from INPUT in FIG. 6. Referring to FIG. 6, elliptical portions indicate data conversion processes, which are referred to as "processes"; arrows indicate transfer of the processed data, which are referred to as "arrows"; rectangular portions indicate data production or data consumption, which are referred to as "actor objects"; and portions sandwiched between two lines represent passive data storage, which are referred to as "data store objects".

The initial estimated value $X_0$ of the state vector $x_k$ and the initial estimated error covariance $P_0$ of the estimated error covariance $P_k$ input using the input unit 16 are stored via an internal bus 31 into the data memory 13.

In step S2, the CPU 11 determines that k of the initial estimated value $X_0$ of the state vector $x_k$ and the initial estimated error covariance $P_0$ of the estimated error covariance $P_k$ stored in the data memory 13 is k=1, i.e., the first cycle data. This is used as the first cycle internal information.

In step S3, the CPU 11 computes and predicts a (k+1)-th cycle state vector $X_{(k+1)}$ and estimated error covariance $P_{(k+1)}$ using the updated k-th cycle vector $x_k$ and estimated error covariance $P_k$. Details of the prediction processing are illustrated in FIG. 5.

Figure 5:
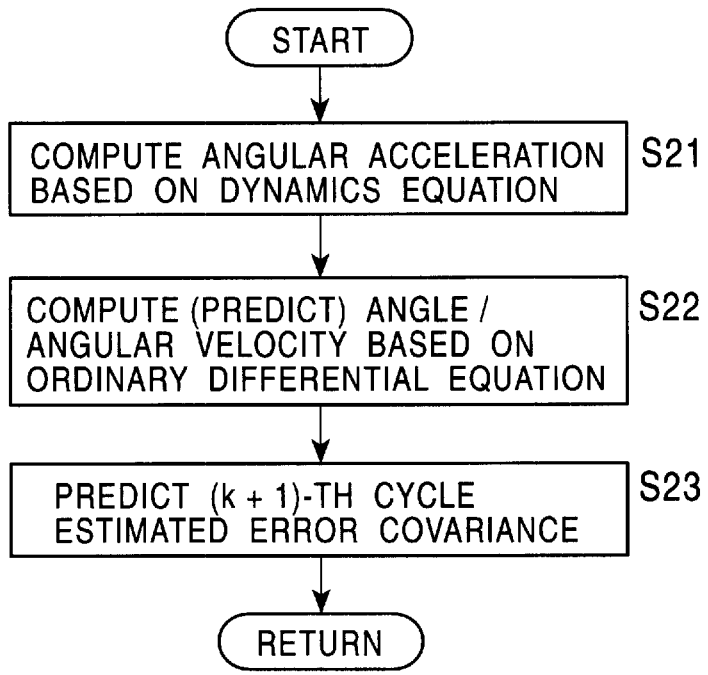
FIG. 5 is a flowchart showing a prediction process in step S6 shown in FIG. 3.

In step S21 in FIG. 5, the CPU 11 computes a k-th cycle angular acceleration $q_k$ with two dots () using the state vector $x_k$ stored in the data memory 13. Specifically, an expression (18) of a dynamics equation, which is often used in robotics to obtain a relationship among an angle, acceleration, and torque, is modified into an expression (19). Using the expression (19), the CPU 11 computes the angular acceleration $q_k$ with two dots by substituting the angle $q_k$, the angular velocity $q_k$ with a dot, and the torque $\tau_k$:

$$\vec{\tau} = M\ddot{\vec{q}} + \vec{b}(\vec{q}, \dot{\vec{q}}) \tag{18}$$

$$\ddot{\vec{q}} = M^{-1}(\vec{\tau} - \vec{b}(\vec{q}, \dot{\vec{q}})) \tag{19}$$

For a matrix M (mass matrix), it is certain that there is always an inverse matrix $M^{-1}$. (This is described in "Introduction to Robotics-Mechanics and Control" by John J. Craig, second edition, Addison-Wesley Publishing Co., 1989.) Thus, the angular acceleration $q_k$ with two dots is computed based on the expression (19).

Referring to FIG. 6, step S21 is illustrated by arrows indicating the state vector having the angle, angular velocity, and torque stored in a data store sd directed to an angular acceleration computing process de in a prediction block, angular acceleration computing processing in the angular acceleration computing process de, and an arrow indicating the angular acceleration computed in the angular acceleration computing process directed to an angle/angular velocity prediction process ode.

In step S22, the CPU 11 computes the next (k+1)-th cycle angle $q_{k+1}$ and angular velocity $q_{k+1}$ with a dot () based on the state vector $x_k$ stored in the data memory 13 and the angular acceleration $q_k$ with two dots () computed in step S21. An ordinary differential equation of an expression (20) is used to compute the next (k+1)-th cycle vector $z_{k+1}$ based on a vector $z_k$ and its differential $z_k$ with a dot ():

$$\vec{z_{k+1}} = ODEINT(\vec{z_k}, \dot{\vec{z}}_k) \tag{20}$$

In the above expression, ODEINT includes an ordinary differential equation integrator (solver), which is typically represented by the Runge-Kutta method. Using ODEINT and the angular acceleration q with two dots () computed by the expression (19), the CPU 11 computes the next (k+1)-th cycle angle $q_{k+1}$ and angular velocity $q_{k+1}$ with a dot () based on an expression (21):

$$\begin{bmatrix} \vec{q_{k+1}} \\ \dot{\vec{q_{k+1}}} \end{bmatrix} = ODEINT\left( \begin{bmatrix} \vec{q} \\ \dot{\vec{q}} \end{bmatrix}, \begin{bmatrix} \dot{\vec{q}} \\ \ddot{\vec{q}} \end{bmatrix} \right) \tag{21}$$

Accordingly, the next (k+1)-th cycle state vector $x_{k+1}$ is accurately computed based on information on the present cycle state vector $x_k$. With continued reference to FIG. 6, step S22 is illustrated by arrows indicating the angle and angular velocity stored in the data store sd directed to the angle/angular velocity prediction process ode, the angle/angular velocity prediction processing in the angle/angular velocity prediction process ode, and arrows indicating a predicted angle and predicted angular velocity computed in the angle/angular velocity prediction process ode directed to an updating process ud.

The above-described prediction processing is rearranged as follows:

$$\begin{bmatrix} \vec{q_{k+1}} \\ \dot{\vec{q_{k+1}}} \\ \vec{\tau_{k+1}} \end{bmatrix} = \begin{bmatrix} ODEINT\left( \begin{bmatrix} \vec{q_k} \\ \dot{\vec{q_k}} \end{bmatrix}, \begin{bmatrix} \dot{\vec{q_k}} \\ \ddot{\vec{q_k}} \end{bmatrix} \right) \\ \tau_k \end{bmatrix} + \begin{bmatrix} \vec{\varepsilon_1} \\ \vec{\varepsilon_2} \\ \vec{\omega} \end{bmatrix} \tag{22}$$

The articulated motion estimating unit 1 assumes that torque changes are constant and the torque changes are Gaussian noise. In the expression (22), $\omega$ represents Gaussian noise. The above-described method performs substantially accurate computation of the next cycle angle and angular velocity. In order to eliminate or minimize numerical errors, noise vectors $\epsilon_1$ and $\epsilon_2$ representative of the numerical errors are defined. The noise vectors $\epsilon_1$ and $\epsilon_2$ are very small values. For example, the noise vectors $\epsilon_1$ and $\epsilon_2$ are small enough with respect to the Gaussian noise $\omega$, satisfying $\epsilon_1, \epsilon_2 << \omega$. It is possible to increase the values of the noise vectors $\epsilon_1$ and $\epsilon_2$ in a processing system with lower numerical calculation accuracy. When an ordinary differential equation integrator (solver) with lower accuracy, such as the Euler method, is used to minimize computation time, the values of the noise vectors $\epsilon_1$ and $\epsilon_2$ may be increased.

Step S21, i.e., the expression (19), and step S22, i.e., the expression (22), may be concluded as follows:

$$\begin{bmatrix} \vec{q_{k+1}} \\ \dot{\vec{q_{k+1}}} \\ \vec{\tau_{k+1}} \end{bmatrix} = \begin{bmatrix} ODEINT\left( \begin{bmatrix} \vec{q_k} \\ \dot{\vec{q_k}} \end{bmatrix}, \begin{bmatrix} \dot{\vec{q_k}} \\ M^{-1}(\vec{\tau_k} - \vec{b}(\vec{q_k}, \dot{\vec{q_k}})) \end{bmatrix} \right) \\ \tau_k \end{bmatrix} + \begin{bmatrix} \vec{\varepsilon_1} \\ \vec{\varepsilon_2} \\ \vec{\omega} \end{bmatrix} \tag{23}$$

In step S23, the CPU 11 computes the next (k+1)-th cycle estimated error covariance $P_{k+1}$ based on the estimated error covariance $P_k$ stored in the data memory 13. The CPU 11 uses the next (k+1)-th cycle angle $q_{k+1}$ and angular acceleration $q_{k+1}$ with two dots () computed in step S22 to compute a state transition matrix $A_k$ based on an expression (24) (the same as the expression (15)):

$$A_{k(i,j)} = \frac{\partial f_{(i)}(\vec{X_k})}{\partial x_{k(j)}} \tag{24}$$

As described above, $A_{k(i,j)}$ represents a matrix element in the i-th row, j-th column, of the state transition matrix $A_k$, and $f_{(j)}$ represents the j-component of a function f. It is shown that $A_{k(i,j)}$ is computed by partially differentiating $f_{(i)}$ by the j-component of the state vector $x_k$.

Next, the CPU 11 uses the computed state transition matrix $A_k$ and the estimated error covariance $P_k$ stored in the data memory 13 to compute the next (k+1)-th cycle estimated error covariance $P^-_{k+1}$ based on an expression (25) (the same as the expression (7)):

$$P^-_{k+1} = A_k P_k A_k^T + Q_k \qquad (25)$$

Referring back to FIG. 3, in step S4, the CPU 11 obtains the k-th cycle observation data based on the data stored in the data memory 13.

Instead of the observation data, a sensor signal may be used. In such a case, an interface with the sensor signal is provided in the input unit 16 shown in FIG. 1. Alternatively, tracking (characteristic point tracking or region tracking) and segmentation (region segmentation) may be performed for an image in each frame of the image sequence, thus obtaining positional information and posture information for each joint, and a combination of these. The resultant information may be used as the observation data. In this case, an interface with a unit for performing tracking and segmentation is provided in the input unit 16. As described above, when a system for obtaining information from an image is constructed on the same hardware, an interface with an image unit, e.g., a camera or a video, may be provided in the input unit 16. The above-described system may share the units of the articulated motion estimating unit 1. Step S4 corresponds to the input from INPUT shown in FIG. 6.

Figure 4:
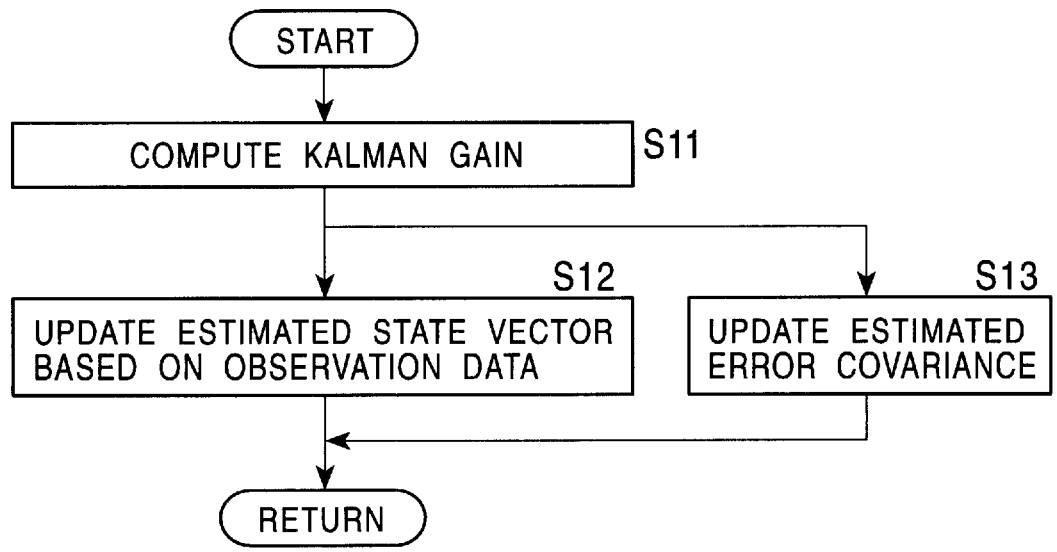
FIG. 4 is a flowchart showing an updating process in step S4 shown in FIG. 3.

In step S5, the CPU 11 updates the data stored in the data memory 13. Details of the updating process are shown in FIG. 4. Specifically, in step S11, the CPU 11 computes a Kalman gain $K_k$ based on the obtained k-th cycle observation data $y_k$. First, the CPU 11 computes an observation matrix $H_k$ based on an expression (26) (the same as the expression (16)):

$$H_{k(i,j)} = \frac{\partial h_{(i)}(\overrightarrow{X_k})}{\partial \overrightarrow{x_{k(j)}}} \qquad (26)$$

As described above, $H_{k(i,j)}$ represents an element in the i-th row, j-th column, of the observation matrix $H_k$. It is shown that $H_{k(i,j)}$ is computed by partially differentiating the i-component of a function h by the j-component of the state vector $x_k$.

The CPU 11 computes the k-th cycle Kalman gain $K_k$ based on an expression (27) (the same as the expression (8)):

$$K_k = P^-_k H_k^T (H_k P^-_k H_k^T + R_k)^{-1} \qquad (27)$$

In the above expression, $P^-_k$ represents the estimated error covariance before the updating, $P_k$ represents the estimated error covariance after the updating, and $H_k^T$ represents a transposed matrix of $H_k$.

In step S12, the CPU 11 updates the estimated value of the state vector x based on the observation data $y_k$. Specifically, the CPU 11 updates the state vector based on the observation data $y_k$ using an expression (28) (the same as the expression (14)):

$$\overrightarrow{X_k} = \overrightarrow{X^-_k} + K_k(\overrightarrow{y_k} - h + i \, \overrightarrow{X_E})) \qquad (28)$$

As described above, $X^-_k$ represents the estimated state vector before the updating, and $X_k$ represents the estimated state vector after the updating.

In step S13, the CPU 11 updates the estimated error covariance $P_k$ based on an expression (29) (the same as the expression (11)):

$$P_k = (I - K_k H_k) P^-_k \qquad (29)$$

In the above expression, I represents a unit matrix that has the same dimensions as $P_k$.

Step S12 and step S13 may be performed simultaneously, or alternatively, may be performed sequentially from step S12 to step S13 or from step S13 to step S12.

Referring back to FIG. 3, in step S6, the CPU 11 stores the updated k-th cycle state vector $X_k$ and estimated error covariance $P_k$ in the data memory 13. In FIG. 6, this process is indicated as follows with corresponding arrows. The state vector having the angle, angular velocity, and torque which are updated in the updating process ud is stored in the data store sd, and the estimated error covariance updated in the updating process ud is transferred to the data store eec.

In step S7, the CPU 11 increments the number of cycles to obtain data for the next cycle. Specifically, the CPU 11 increments the number of the cycles from k to (k+1).

In step S8, the CPU 11 determines whether the above estimation process is completed. If the determination is negative, the CPU 11 returns to step S3 and repeats step S3 to step S8 using the cycle number (k+1).

If the determination is affirmative, the process is ended. Alternatively, the determination may be performed by input from the user. When the data is image data, the affirmative determination may correspond to completion of the processing of the last frame of the image data. The affirmative determination may also be made due to hardware constraints or software constraints, such as the memory being full.

As described above, the articulated motion estimating unit 1 accurately predicts motion by maintaining each joint torque as a state variable and assuming torque changes are constant.

Elements of the state vector x are angle, angular velocity, and torque for each joint. Alternatively, the length of each joint may be added to the elements of the state vector x, so that accuracy of the motion estimation is improved.

Figure 7:
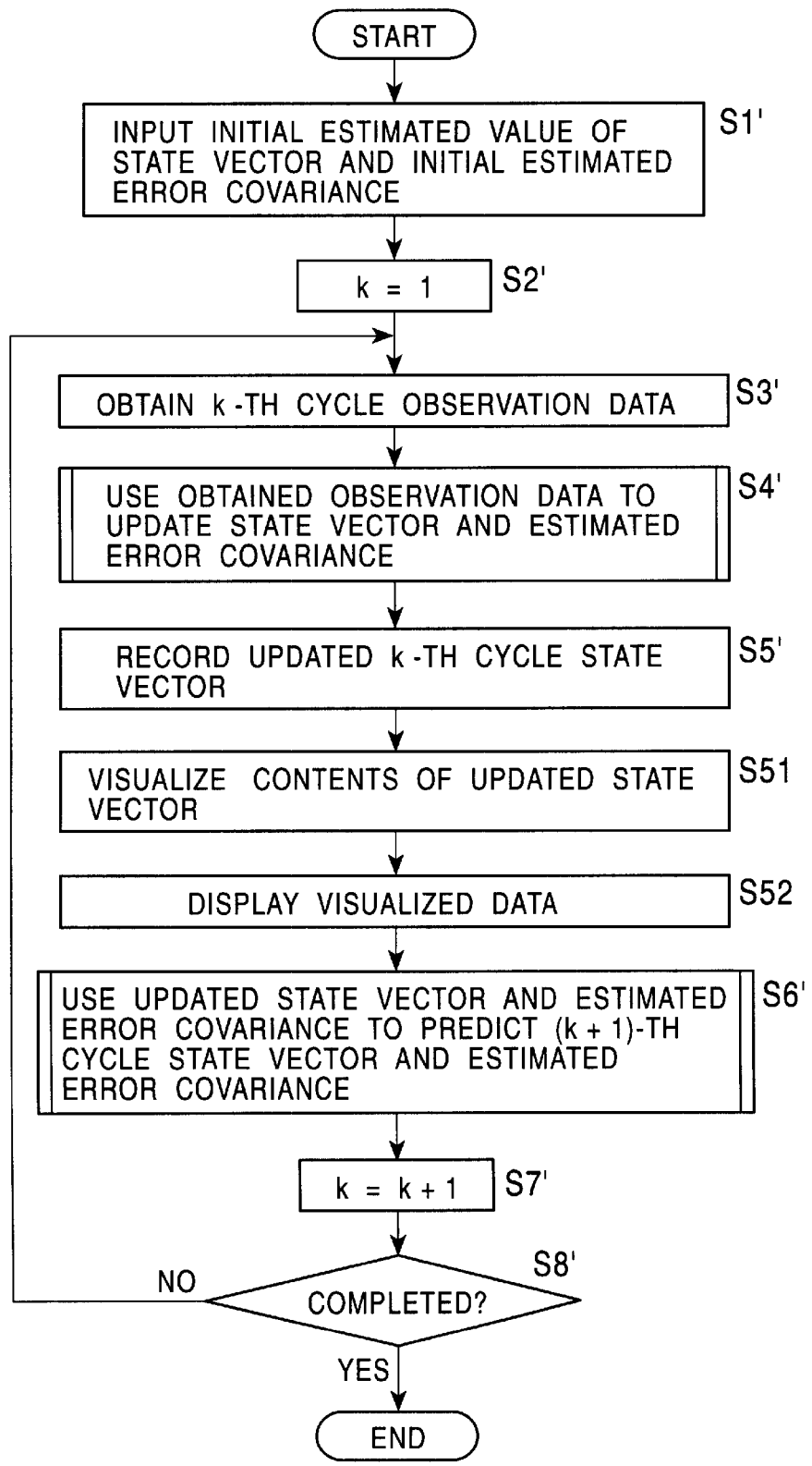
FIG. 7 is another flowchart showing the operation of the articulated motion estimating unit 1 shown in FIG. 1.

In the above embodiment, the updated state vector x is recorded in step S5. However, if there is no need to perform real-time processing, step S5 may be omitted. As illustrated in FIG. 7, step S51 and step S52 may be inserted in between step S5' and step S6'. In step S51, contents of the updated state vector x are visualized, and the frame memory 14 records the visualized state vector x. In step S52, the image display unit 15 displays the visualized data. Accordingly, the user may immediately recognize the prediction and updating of the state vector from the image display unit 15.

In the above embodiment, it is assumed that the observation data has been obtained in advance. However, the articulated motion estimating unit 1 may be utilized for generating observation data. The concept of this is illustrated in FIG. 8.

Figure 8:
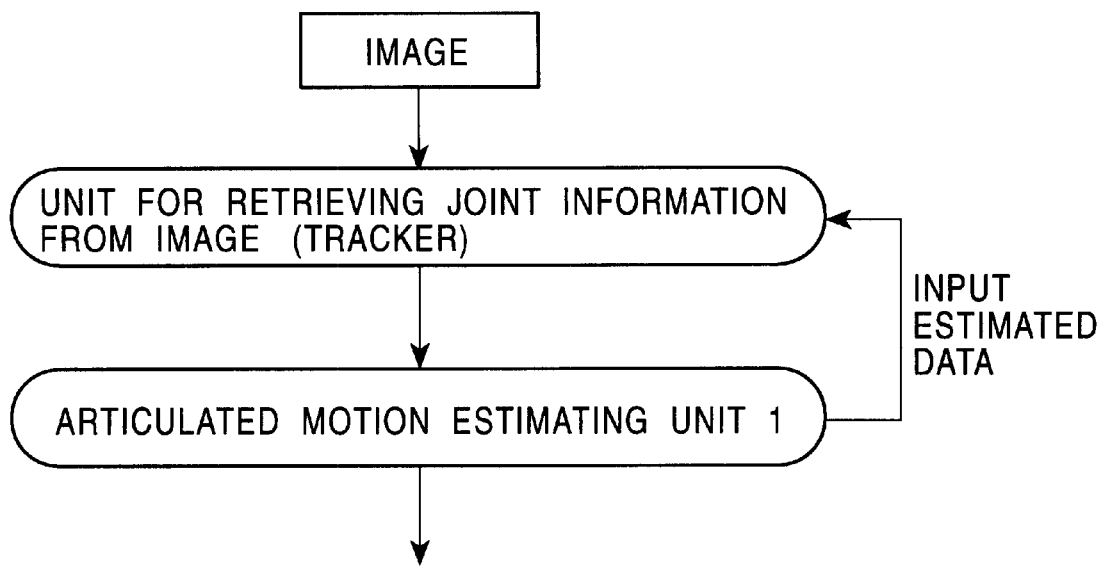
FIG. 8 is a conceptual diagram of an application of the articulated motion estimating unit 1 shown in FIG. 1.

Referring to FIG. 8, information on joints is retrieved from an input image by a retrieving unit, e.g., a tracker, for retrieving information on joints. Then, the articulated motion estimating unit 1 predicts an estimated value, which in turn is fed back to the retrieving unit. Accordingly, the observation accuracy is improved.

Figure 9:
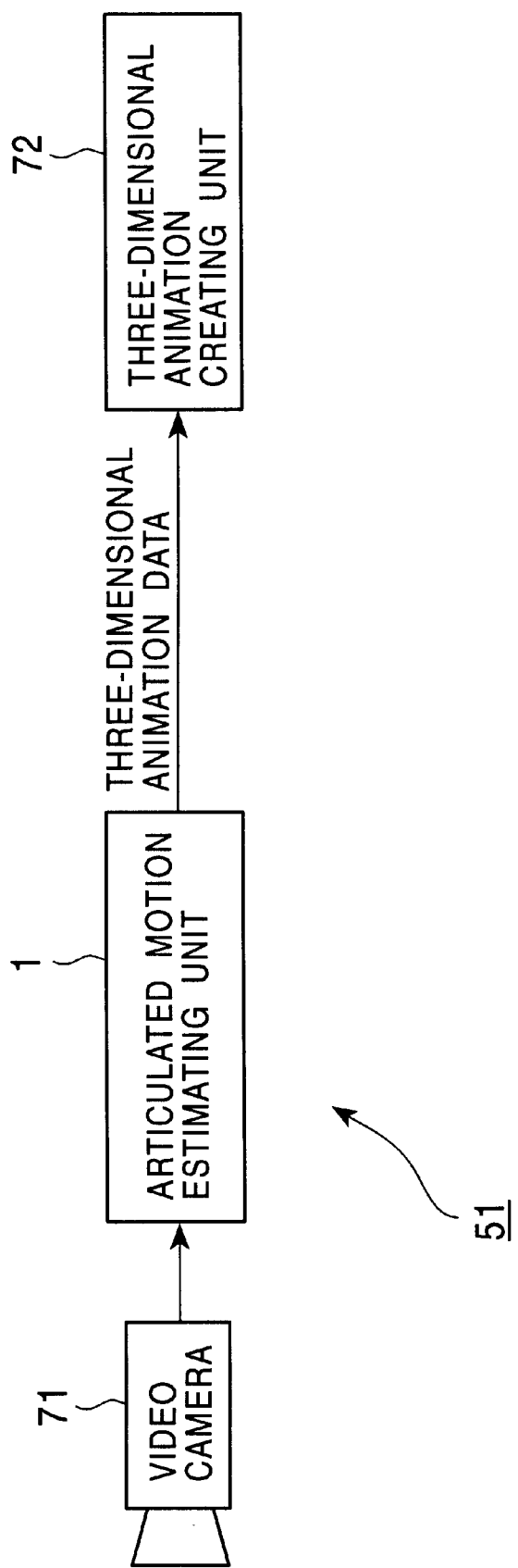
FIG. 9 is a block diagram of a motion capture system 51.

Referring now to FIG. 9 and FIGS. 10A to 10C, an embodiment of a system realizing the concept in FIG. 8 is illustrated. FIG. 9 is a block diagram of a motion capture system 51 utilizing the articulated motion estimating unit 1. A video camera 71 outputs image data, which in turn is input to the articulated motion estimating unit 1. Then, a state vector is estimated, which is input as three-dimensional motion parameters to a three-dimensional animation creating unit 72. The three-dimensional animation creating unit 72 creates three-dimensional animation based on the supplied motion parameter three-dimensional animation data.

Instead of the output from the video camera 71, the input to the articulated motion estimating unit 1 may be input from a videocassette recorder or the like. Image sequence information which is binary-coded in advance may be input to the articulated motion estimating unit 1 via the external storage unit 17.

Figure 10A:
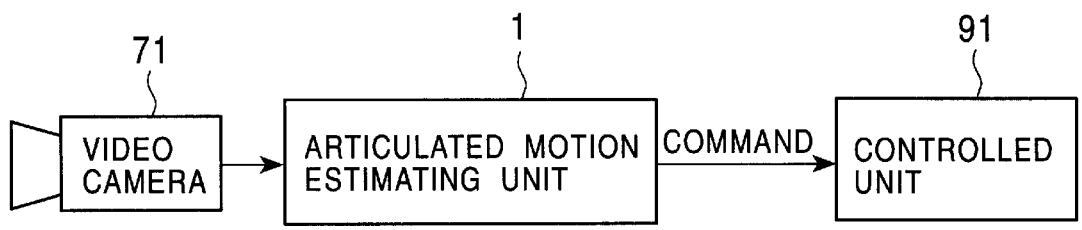
FIGS. 10A to 10C are illustrations of an application of the articulated motion estimating unit 1 shown in FIG. 1.
Figure 10B:
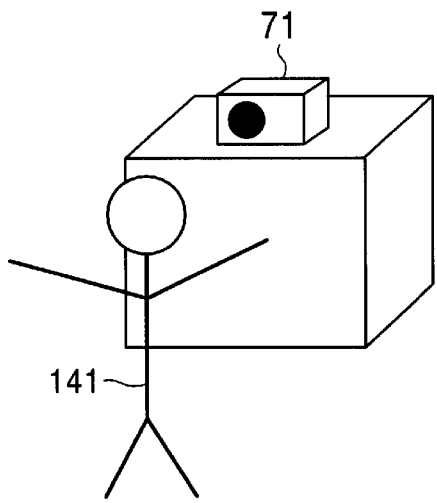
Figure 10C:
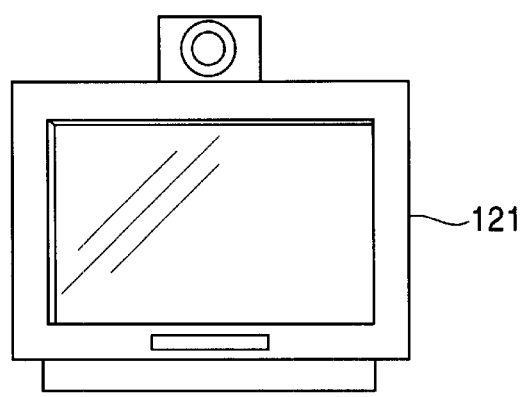
Figure 11:
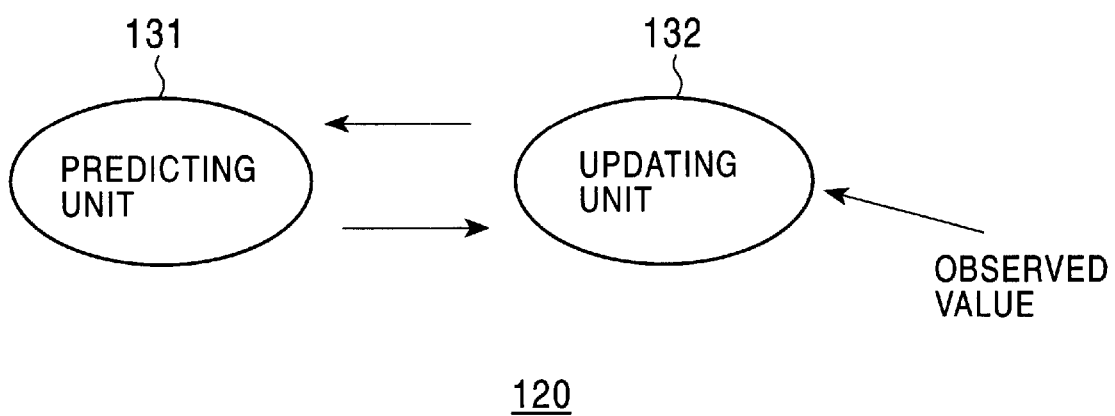
FIG. 11 is a block diagram of a conventional Kalman filter 120.
Figure 12:
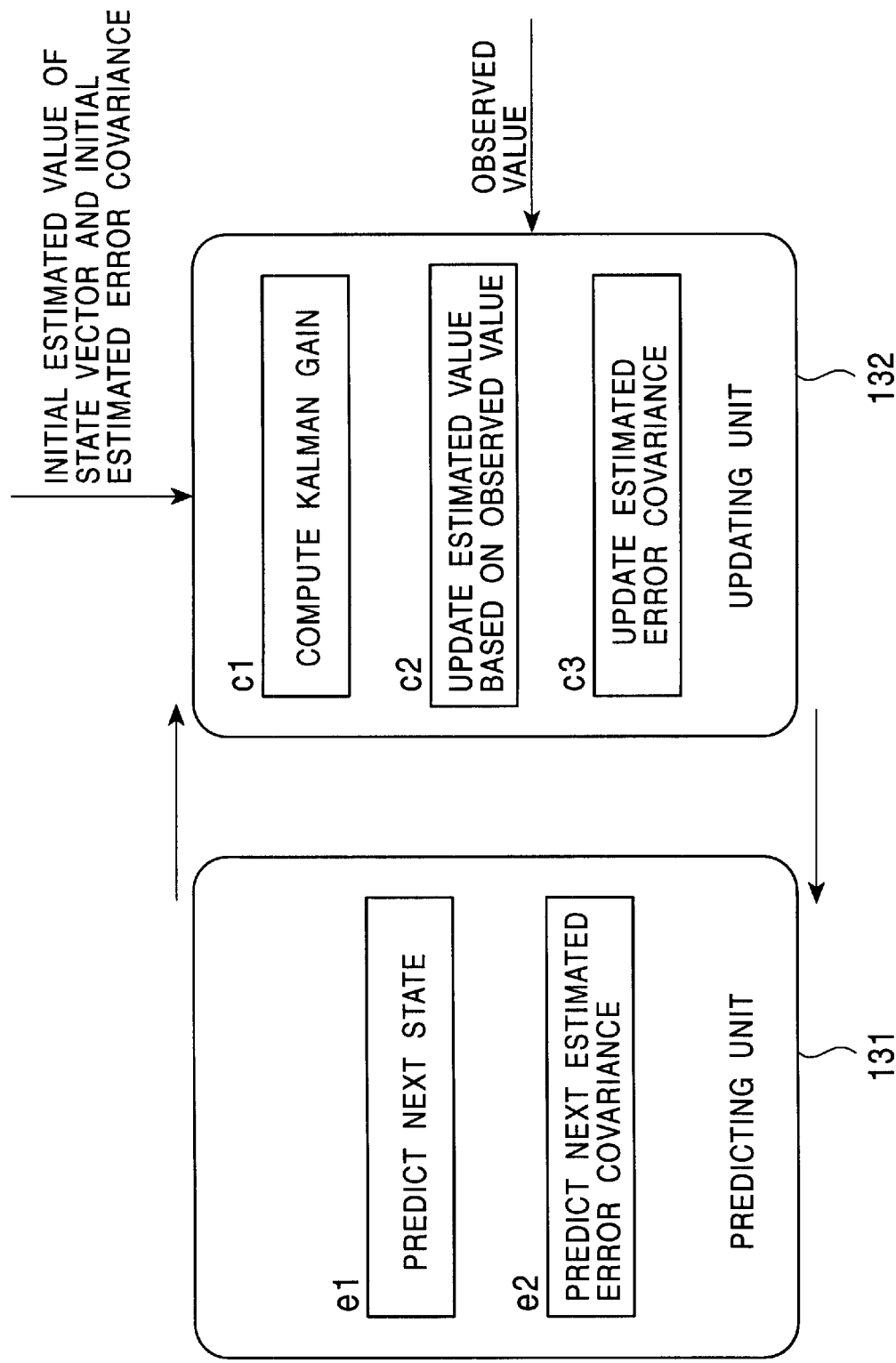
FIG. 12 is an illustration of operation of the Kalman filter 120 shown in FIG. 11.
Figure 13:
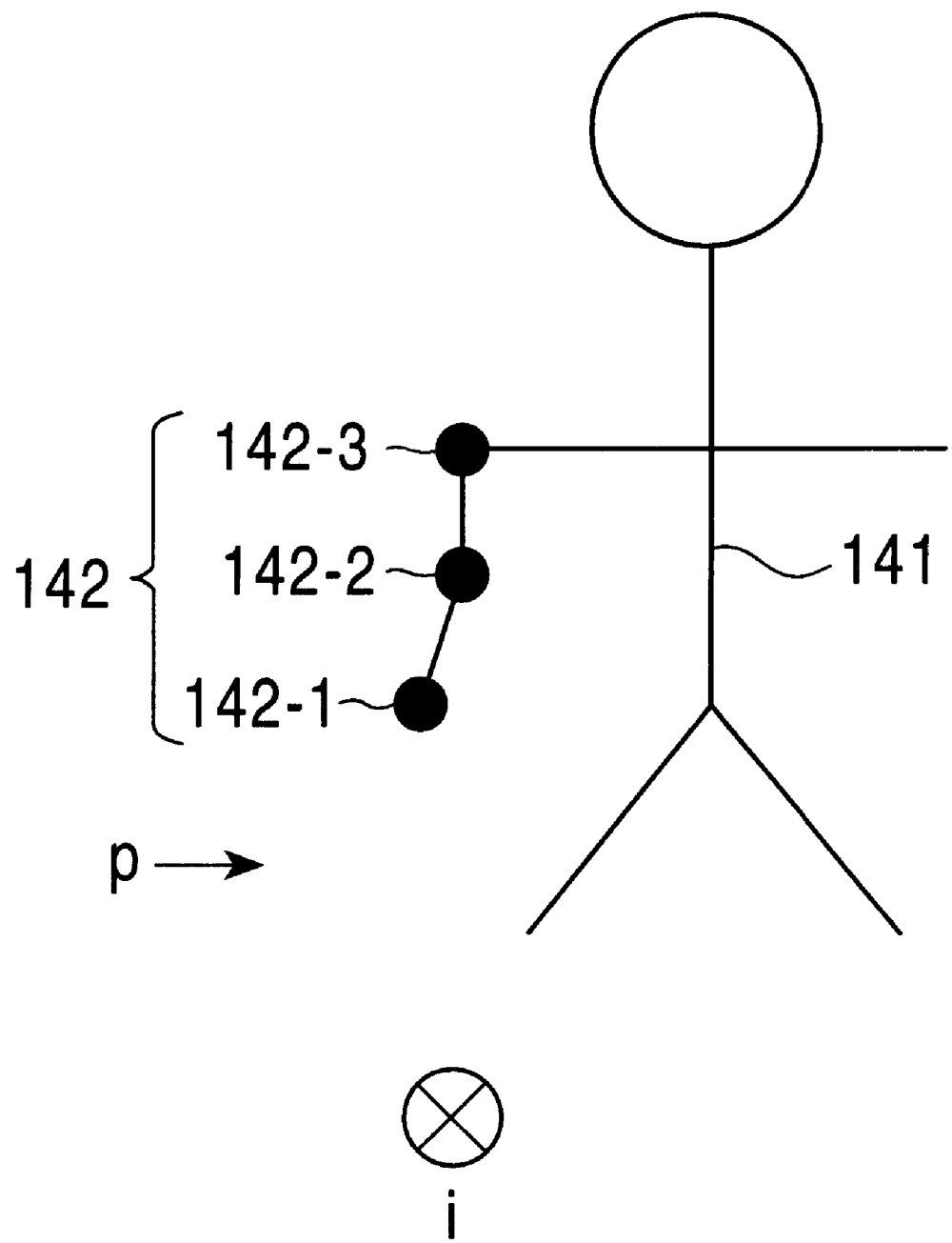
FIG. 13 is an illustration of problems of the Kalman filter 120 shown in FIG. 11.
Figure 14A:
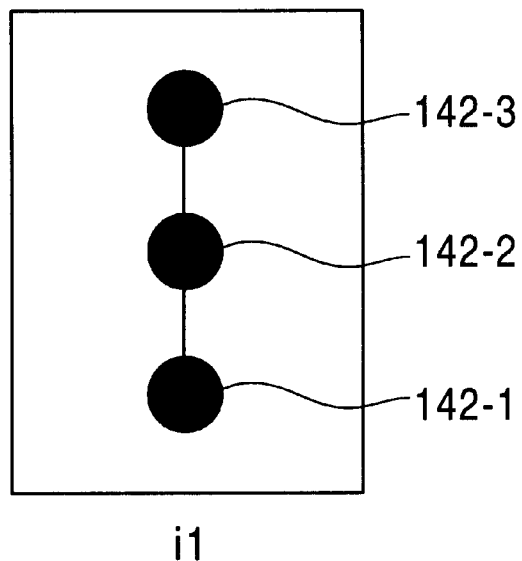
FIGS. 14A and 14B are other illustrations of the problems of the Kalman filter 120 shown in FIG. 11.
Figure 14B:
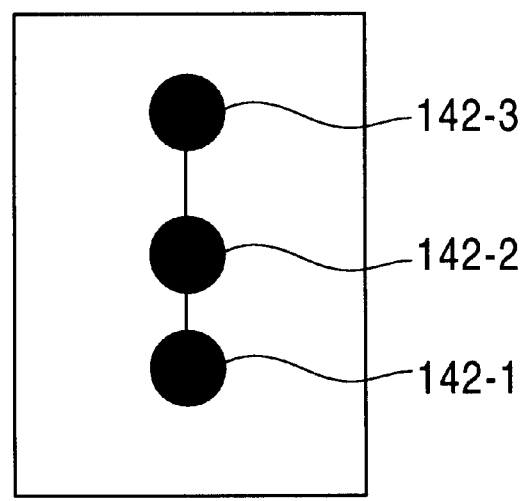
Figure 15A:
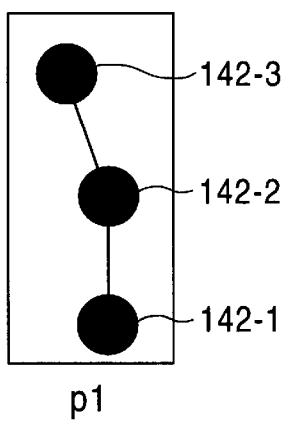
FIGS. 15A to 15E are other illustrations of the problems of the Kalman filter 120 shown in FIG. 11.
Figure 15B:
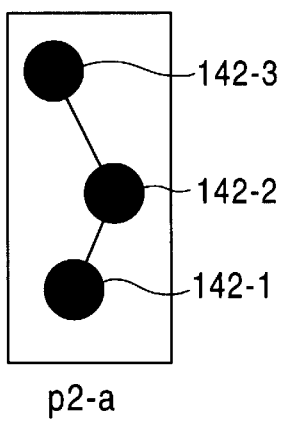
Figure 15C:
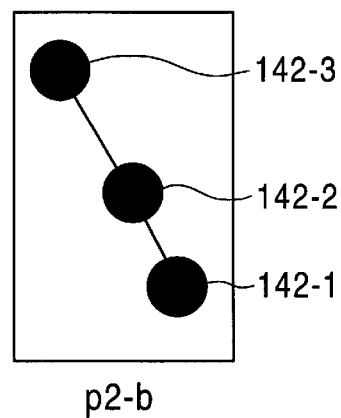
Figure 15D:
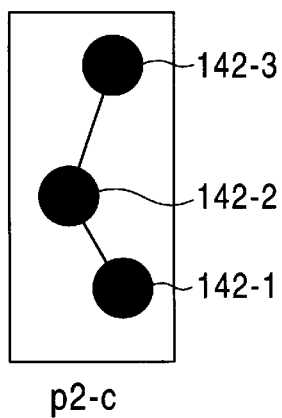
Figure 15E:
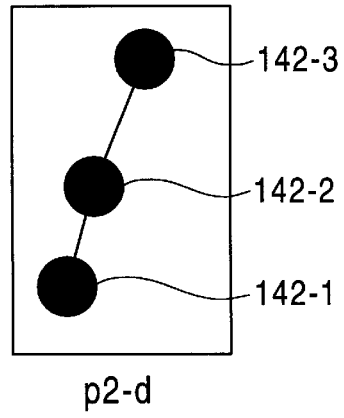
Figure 16B:
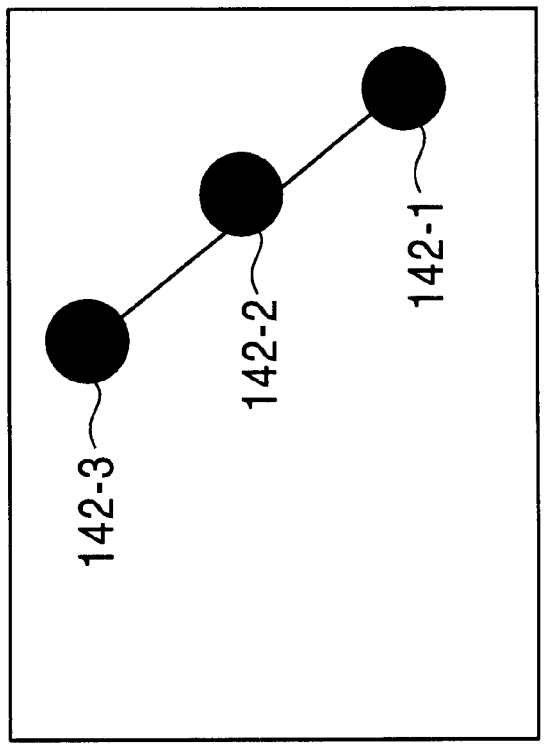
FIGS. 16A and 16B are other illustrations of the problems of the Kalman filter 120 shown in FIG. 11.
Figure 16A:
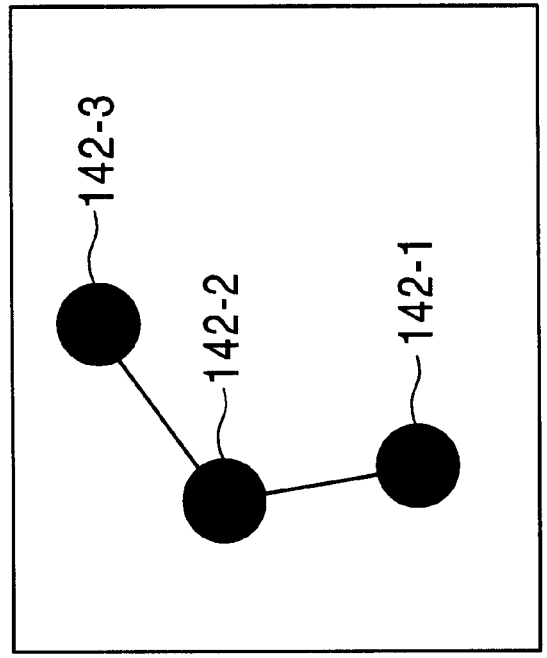

FIGS. 10A to 10C illustrate an example of a system in which the articulated motion estimating unit 1 is used as a user interface unit. Referring to FIG. 10A, the articulated motion estimating unit 1 estimates three-dimensional motion information for joints of a user 141 based on image information (for example, as shown in FIG. 10B, the image information on the user 141 captured by the video camera 71) input from the video camera 71. This is then transformed into a command, which is supplied as a control signal to a controlled unit 91 (for example, as shown in FIG. 10C, a television receiver 121). The controlled unit 91 operates in accordance with the control signal.

The system shown in FIGS. 10A to 10C may be effectively applied to entertainment fields, where the controlled unit 91 includes a game machine or the like.

The system terminology used herein refers to an overall unit formed by a plurality of units.

A series of the above-described processes may be performed by hardware, or alternatively, may be performed by software. In the latter case, the software program is installed from a recording medium into a computer embedded in exclusive hardware, or into a general-purpose personal computer for executing various functions by installing various programs.

The recording media may include, as illustrated in FIG. 1, in addition to the articulated motion estimating unit 1, a magnetic disk 21 (including a floppy disk), an optical disk 22 (including a compact disk-read only memory (CD-ROM) and a digital versatile disk (DVD)), a magneto-optical disk 23 (including a mini-disk (MD)), and packaged media formed of a semiconductor memory 24 or the like. Such media for recording a program are distributed among users for supplying the program, and are to be mounted on the drive 18. The recording media may also include the program memory 12 for recording the program and a hard disk contained in the external storage unit 17, which are supplied to the user as built-in units in the articulated motion estimating unit 1.

In addition to time-series processing following the described order, the process for writing a program to be recorded on the recording medium may also be performed by parallel processing or serial processing.

What is claimed is:

1. An information processing unit for estimating motion of an articulated object, comprising:

information storage means for storing motion information including angle information, angular velocity information and torque information associated with the motion of the object, and an error covariance of the motion information, said information storage means also storing current observation information relating to the position of the object;

motion predicting means for predicting subsequent motion of the object based on the motion information and the error covariance stored in the information storage means; and updating means for updating the motion information stored in the information storage means based on the current observation information;

wherein the motion predicting means determines that a torque associated with the subsequent motion of the object is constant when predicting the subsequent motion of the object.

2. The information processing unit as defined in claim 1 wherein the motion predicting means computes angular acceleration based on the motion information stored in the information storage means, computes angular information and angular velocity information of the subsequent motion of the object based the angular acceleration and the motion information stored in the information storage means, and computes the error covariance of the subsequent motion of the object based angular acceleration of the subsequent motion of the object and the error covariance stored in the information storage means.

3. The information processing unit as defined in claim 1 wherein the updating means computes a Kalman gain using the current observation information for updating the motion information stored in the information storage means.

4. A method for estimating motion of an articulated object, comprising the steps of:

storing motion information including angle information, angular velocity information and torque information associated with the motion of the object, and an error covariance of the motion information in information storage means;

predicting subsequent motion of the object based on the motion information and the error covariance stored in the information storage means;

obtaining a current observation information relating to a position of the object; and updating the motion information stored in the information storage means based on the current observation information;

wherein the motion predicting means determines that a torque associated with the subsequent motion of the object is constant when predicting the subsequent motion of the object.

5. The method as defined in claim 4 wherein the subsequent motion predicting step includes, computing angular acceleration based on the motion information stored in the information storage means, computing angular information and angular velocity information of the subsequent motion of the object based the angular acceleration and the motion information stored in the information storage means, and computing the error covariance of the subsequent motion of the object based angular acceleration of the subsequent motion of the object and the error covariance stored in the information storage means.

6. The method as defined in claim 4 wherein the updating step includes computing a Kalman gain using the current observation information for updating the motion information stored in the information storage means.

* * * * *